(12) United States Patent
Yamanashi et al.

(10) Patent No.: US 11,697,176 B2
(45) Date of Patent: Jul. 11, 2023

(54) LASER MACHINING APPARATUS AND LASER MACHINING METHOD

(71) Applicant: Amada Co., Ltd., Kanagawa (JP)

(72) Inventors: Takaaki Yamanashi, Kanagawa (JP); Koji Funaki, Kanagawa (JP); Akihiko Sugiyama, Kanagawa (JP); Takehiko Shigefuji, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 406 days.

(21) Appl. No.: 17/256,314

(22) PCT Filed: Jun. 13, 2019

(86) PCT No.: PCT/JP2019/023490
§ 371 (c)(1),
(2) Date: Dec. 28, 2020

(87) PCT Pub. No.: WO2020/008833
PCT Pub. Date: Jan. 9, 2020

(65) Prior Publication Data
US 2021/0260703 A1      Aug. 26, 2021

(30) Foreign Application Priority Data

Jul. 6, 2018   (JP) .................................. 2018-128774

(51) Int. Cl.
*B23K 26/38*     (2014.01)
*B23K 26/08*     (2014.01)
(Continued)

(52) U.S. Cl.
CPC .......... *B23K 26/38* (2013.01); *B23K 26/0876* (2013.01); *B23K 26/1462* (2015.10); *B23K 2101/18* (2018.08)

(58) Field of Classification Search
CPC .............. B23K 2101/18; B23K 26/082; B23K 26/0876; B23K 26/1462; B23K 26/38; B23K 37/0235; B23K 37/0408
(Continued)

(56) References Cited

U.S. PATENT DOCUMENTS 5,841,097 A * 11/1998 Esaka ................... B23K 26/067
219/121.64
2005/0218128 A1   10/2005 Han

FOREIGN PATENT DOCUMENTS

CN          102653030        *  9/2012
DE     102008053397 A1   12/2009
(Continued)

OTHER PUBLICATIONS

English language translation of cited WO2017/179642 (Year: 2017).*
(Continued)

*Primary Examiner* — Dana Ross
*Assistant Examiner* — Joseph W Iskra
(74) *Attorney, Agent, or Firm* — Renner, Otto, Boisselle & Sklar, LLP

(57) ABSTRACT

A beam vibrating mechanism vibrates a laser beam in a parallel direction with a cutting advancing direction of a sheet metal. An amplitude amount of the laser beam is Qx, a radius of a first circular region having an area occupying 86% beam energy at a center side of total beam energy in a sectional area of the laser beam on a top surface of the sheet metal is rtop, and a radius of a second circular region having an area occupying 86% beam energy at a center side of total beam energy in a sectional area of the laser beam in a bottom surface of the sheet metal is rbottom. A calculation value Va is expressed by the expression: Va=(Qx+rtop+√2×rbottom). When a standard deviation of the calculation value Va at a time of cutting sheet metals of a plurality of plate thick-
(Continued)

nesses is Vasd, a nozzle having a diameter of an opening between a minimum value obtained by 2Va−Vasd, and a maximum value obtained by 2.5 Va+Vasd is used as a nozzle attached to a machining head.

6 Claims, 7 Drawing Sheets

(51) Int. Cl.
*B23K 26/14* (2014.01)
*B23K 101/18* (2006.01)

(58) Field of Classification Search
USPC .................................................. 219/121.72
See application file for complete search history.

(56) References Cited

FOREIGN PATENT DOCUMENTS

| | | |
|---|---|---|
| JP | 2005-288541 A | 10/2005 |
| JP | 2007-21579 A | 2/2007 |
| WO | 2015/156119 A1 | 10/2015 |
| WO | 2017179642 A1 | 10/2017 |

OTHER PUBLICATIONS

English language translation of cited DE102008053397 (Year: 2012).*
International Search Report for corresponding Application No. PCT/JP2019/023490, dated Aug. 27, 2019.
Written Opinion for corresponding Application No. PCT/JP2019/023490, dated Aug. 27, 2019.
Heston, T., Shaping the Beam for the Best Cut, The Fabricator, Jan. 2017, pp. 66-67 (cited in the specification).
Extended European Search Report for corresponding EP Application No. 19829853.1 dated Jul. 30, 2021.

* cited by examiner

Fig. 7

| NUMBER | PLATE THICKNESS t (mm) | AMPLITUDE AMOUNT Qx (mm) | RADIUS rtop (mm) | RADIUS rbottom (mm) | CALCULATION VALUE Va Qx+rtop+√2 × rbottom (mm) | MINIMUM VALUE Dmin 2Va−Vasd (mm) | NOZZLE DIAMETER IN CALCULATION (mm) | MAXIMUM VALUE Dmax 2.5Va+Vasd (mm) | MINIMUM NOZZLE DIAMETER (mm) | STANDARD NOZZLE DIAMETER (mm) | GAS PRESSURE (MPa) |
|---|---|---|---|---|---|---|---|---|---|---|---|
| 1 | 4 | 0.140 | 0.057 | 0.116 | 0.361 | 0.44 | 1.0 | 1.18 | 1.0 | 4.0 | 1.2 |
| 2 | 6 | 0.224 | 0.057 | 0.185 | 0.543 | 0.81 | 1.0, 1.5 | 1.64 | 1.0 | 4.0 | 1.4 |
| 3 | 8 | 0.301 | 0.057 | 0.255 | 0.719 | 1.16 | 1.5, 2.0 | 2.08 | 1.5 | 4.0 | 1.6 |
| 4 | 10 | 0.500 | 0.057 | 0.325 | 1.017 | 1.76 | 2.0 | 2.82 | 2.0 | 7.0 | 1.3 |

LASER MACHINING APPARATUS AND LASER MACHINING METHOD

TECHNICAL FIELD

The present disclosure relates to a laser machining apparatus and a laser machining method that machine sheet metal by a laser beam.

BACKGROUND ART

Laser machining apparatuses that cut sheet metal by laser beams emitted from laser oscillators, and produce products having predetermined shapes are widely used. In recent years, as the laser oscillator that emits a laser beam used in a laser machining apparatus, a fiber laser oscillator or a direct diode laser oscillator (DDL oscillator) that is compact and low cost has been more widely used as compared with a $CO_2$ laser oscillator that is large and high cost.

The wavelength of the laser beam emitted by a $CO_2$ laser oscillator is approximately 10 μm, while the wavelength of the laser beam emitted by a fiber laser oscillator or a DDL oscillator is approximately 1 μm. Accordingly, a beam waist of the laser beam emitted by the fiber laser oscillator or a DDL oscillator is small, and a kerf width of a groove formed in a periphery of the product by irradiation of the laser beam is narrow.

CITATION LIST

Non-Patent Literature

Non-Patent Literature 1: JANUARY 2017 The FABRICATOR 67, Shaping the beam for the best cut

SUMMARY

A laser machining apparatus includes an assist gas supply device, and cuts sheet metal while discharging molten metal melted in a kerf by blowing assist gas to the sheet metal. In general, it is necessary to make a kerf width wider as the plate thickness of the sheet metal is thicker, and with this, it is necessary to increase a diameter of an opening (nozzle diameter) formed in a nozzle fitted to a tip end of the machining head. In order to keep assist gas pressure in the machining head at a constant level or more even when the nozzle diameter becomes large, it is necessary to increase a flow rate of the assist gas. In other words, as the nozzle diameter increases, the consumption amount of the assist gas increases, and cost is increased.

A laser machining apparatus and a laser machining method that can cut sheet metal while decreasing a consumption amount of assist gas to be smaller than a conventional laser machining apparatus and laser machining method are required.

According to a first aspect of one or more embodiments, a laser machining apparatus is provided, the laser machining apparatus including a machining head with a nozzle being attached to a tip end of the machining head, the nozzle having an opening formed therein, a laser beam for cutting a sheet metal being emitted through the opening, a moving mechanism configured to relatively move the machining head with respect to a surface of the sheet metal, and a beam vibrating mechanism configured to vibrate the laser beam in a parallel direction with a cutting advancing direction of the sheet metal when the sheet metal is cut by the machining head being relatively moved by the moving mechanism, wherein a calculation value Va is expressed by the following expression, where an amplitude amount of the laser beam by the beam vibrating mechanism is Qx, a radius of a first circular region having an area occupying 86% beam energy at a center side of total beam energy in a sectional area of the laser beam on a top surface of the sheet metal is rtop, and a radius of a second circular region having an area occupying 86% beam energy at a center side of total beam energy in a sectional area of the laser beam in a bottom surface of the sheet metal is rbottom, and when a standard deviation of the calculation value Va at a time of cutting sheet metals of a plurality of plate thicknesses is Vasd, a nozzle having a diameter of an opening between a minimum value obtained by 2Va−Vasd, and a maximum value obtained by 2.5 Va+Vasd is used as the nozzle.

$$Va=(Qx+r\text{top}+\sqrt{2}\times r\text{bottom}) \qquad \text{[Expression 1]}$$

According to a second aspect of one or more embodiments, a laser machining method is provided, the laser machining method including emitting a laser beam for cutting a sheet metal from a nozzle to irradiate the sheet metal with the laser beam, the nozzle being attached to a tip end of a machining head and having an opening formed therein, cutting the sheet metal by relatively moving the machining head with respect to a surface of the sheet metal, and vibrating the laser beam in a parallel direction with a cutting advancing direction of the sheet metal when the sheet metal is cut, wherein a calculation value Va is expressed by the following expression, where an amplitude amount at a time of vibrating the laser beam is Qx, a radius of a first circular region having an area occupying 86% beam energy at a center side of total beam energy in a sectional area of the laser beam on a top surface of the sheet metal is rtop, and a radius of a second circular region having an area occupying 86% beam energy at a center side of total beam energy in a sectional area of the laser beam in a bottom surface of the sheet metal is rbottom, and when a standard deviation of the calculation value Va at a time of cutting sheet metals of a plurality of plate thicknesses is Vasd, a nozzle having a diameter of an opening between a minimum value obtained by 2Va−Vasd, and a maximum value obtained by 2.5 Va+Vasd is used as the nozzle.

$$Va=(Qx+r\text{top}+\sqrt{2}\times r\text{bottom}) \qquad \text{[Expression 2]}$$

According to the laser machining apparatus and the laser machining method of one or more embodiments, it is possible to cut the sheet metal while decreasing the consumption amount of the assist gas to be smaller than the conventional laser machining apparatus and laser machining method.

BRIEF DESCRIPTION OF DRAWINGS

FIG. 7 is a diagram illustrating, in tabular format, examples used to determine a minimum nozzle diameter with which cutting of a sheet metal is possible by using a parallel vibration pattern.

DESCRIPTION OF EMBODIMENT

Hereinafter, a laser machining apparatus and a laser machining method of one or more embodiments will be described with reference to the accompanying drawings. The laser machining apparatus and the laser machining method of one or more embodiments reduces a consumption amount of assist gas by using a nozzle having a smaller nozzle diameter than the conventional laser machining apparatus and laser machining method, as a nozzle used for cutting a sheet metal.

Figure 1:
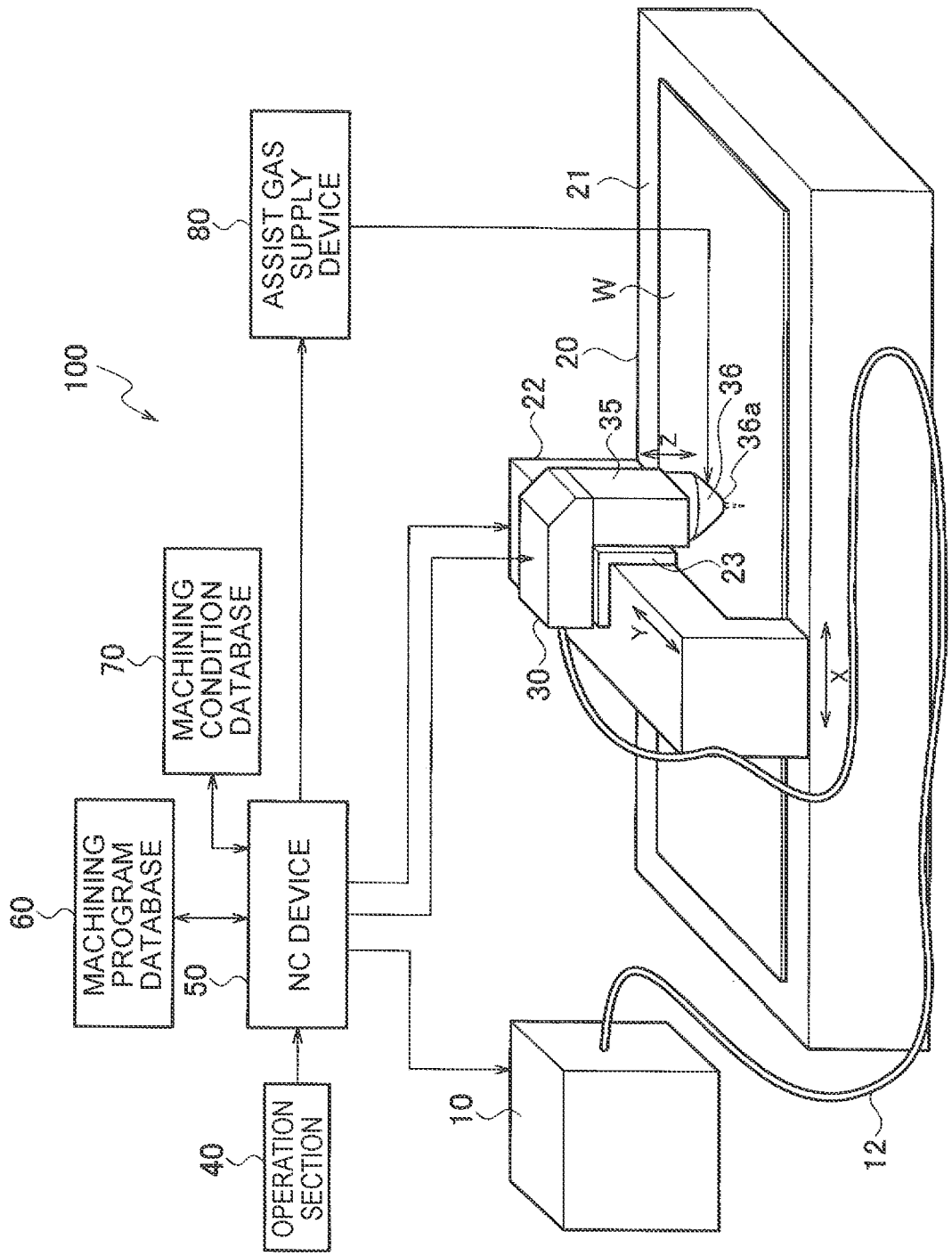
FIG. 1 is a diagram illustrating an entire configuration example of a laser machining apparatus of one or more embodiments.

In FIG. 1, a laser machining apparatus 100 includes a laser oscillator 10 that generates and emits a laser beam, a laser machining unit 20, a process fiber 12 that transmits the laser beam emitted by the laser oscillator 10 to the laser machining unit 20.

Further, the laser machining apparatus 100 includes an operation section 40, a NC device 50, a machining program database 60, a machining condition database 70, and an assist gas supply device 80. The NC device 50 is an example of a control device that controls respective parts of the laser machining apparatus 100.

As the laser oscillator 10, a laser oscillator that amplifies an excitation beam emitted from a laser diode to emit a laser beam of a predetermined wavelength, or a laser oscillator that directly uses a laser beam emitted by a laser diode is preferable. The laser oscillator 10 is, for example, a solid laser oscillator, a fiber laser oscillator, a disk laser oscillator, or a direct diode laser oscillator (DDL oscillator).

The laser oscillator 10 emits a laser beam in a band of 1 μm with a wavelength of 900 nm to 1100 nm. Taking a fiber laser oscillator and a DDL oscillator as examples, the fiber laser oscillator emits a laser beam with a wavelength of 1060 nm to 1080 nm, and the DDL oscillator emits a laser beam with a wavelength of 910 mm to 950 nm.

The laser machining unit 20 has a machining table 21 where sheet metal W to be machined is placed, a gate-type X-axis carriage 22, a Y-axis carriage 23, a collimator unit 30 fixed to the Y-axis carriage 23, and a machining head 35. The sheet metal W is made of a stainless steel. In one or more embodiments, a plate thickness of the sheet metal W is any of 3 mm to 25 mm.

The X-axis carriage 22 is configured to be movable in an X-axis direction on the machining table 21. The Y-axis carriage 23 is configured to be movable in a Y-axis direction perpendicular to the X-axis on the X-axis carriage 22. The X-axis carriage 22 and the Y-axis carriage 23 function as a moving mechanism that moves the machining head 35 in the X-axis direction, the Y-axis direction, or an arbitrary composition direction of an X-axis and a Y-axis, along a surface of the sheet metal W.

Instead of moving the machining head 35 along the surface of the sheet metal W, a position of the machining head 35 may be fixed, and the sheet metal W may be configured to move. The laser machining apparatus 100 can include the moving mechanism that moves the machining head 35 relatively to the surface of the sheet metal W.

To the tip of the machining head 35, a nozzle 36 that has a circular opening 36a at a tip end portion, and emits a laser beam from the opening 36a is attached. The sheet metal W is irradiated with the laser beam emitted from the opening 36a of the nozzle 36. The assist gas supply device 80 supplies, for example, nitrogen to the machining head 35 as assist gas. At a time of machining the sheet metal W, the assist gas is blown to the sheet metal W from the opening 36a. The assist gas discharges molten metal in a kerf where the sheet metal W is melted.

Figure 2:
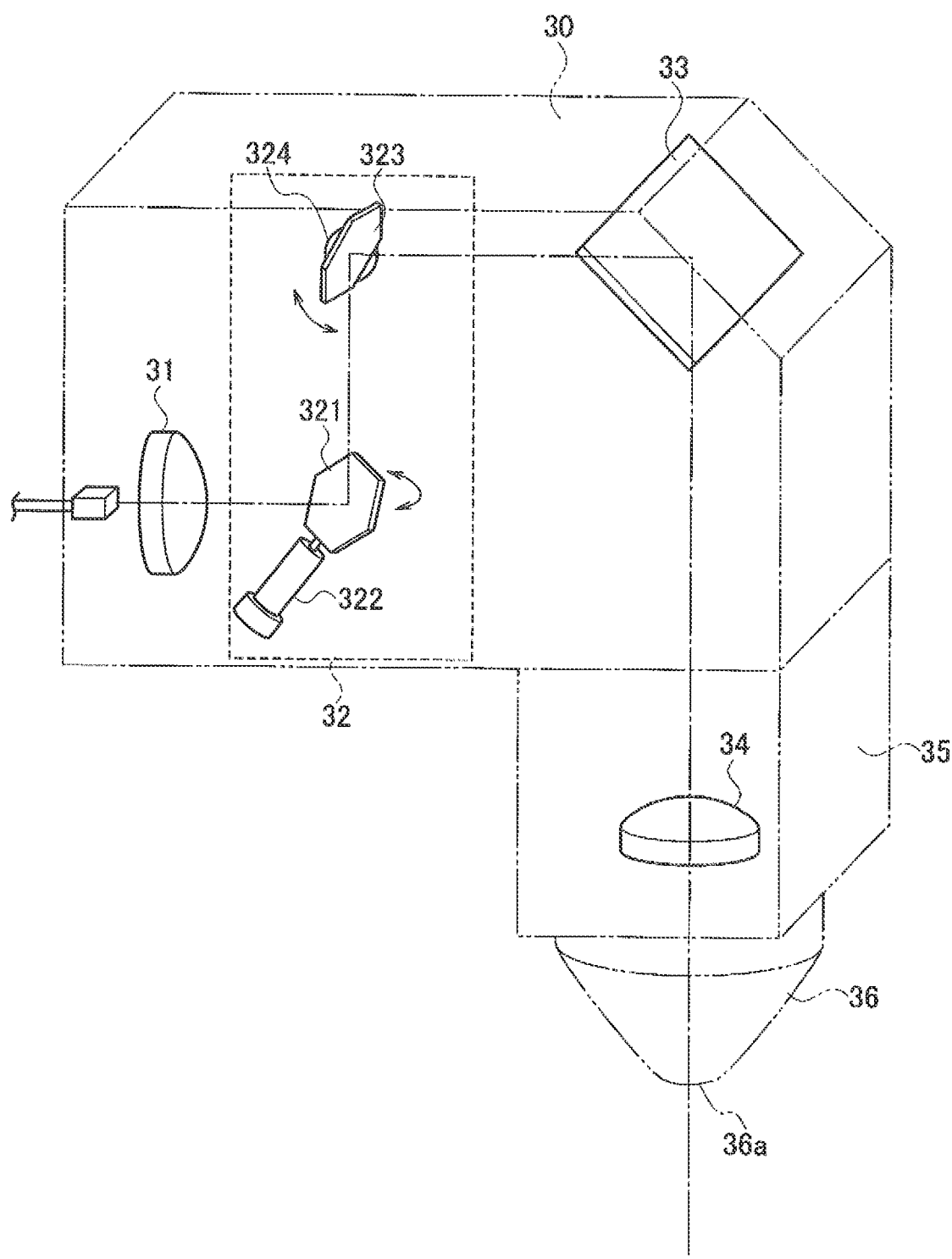
FIG. 2 is a perspective view illustrating detailed configuration examples of a collimator unit and a machining head in the laser machining apparatus of one or more embodiments.

As illustrated in FIG. 2, the collimator unit 30 includes a collimation lens 31 that converts a divergent laser beam emitted from the process fiber 12 into a parallel laser beam (collimated laser beam). Further, the collimator unit 30 includes a galvano scanner unit 32, and a bend mirror 33 that reflects a laser beam emitted from the galvano scanner unit 32 toward a lower part in a Z-axis direction perpendicular to the X-axis and the Y-axis. The machining head 35 includes a focusing lens 34 that focuses the laser beam reflected by the bend mirror 33, and irradiates the sheet metal W.

The laser machining apparatus 100 is centered so that the laser beam emitted from the opening 36a of the nozzle 36 is located at a center of the opening 36a. In a regular state, the laser beam is emitted from the center of the opening 36a. The galvano scanner unit 32 functions as a beam vibrating mechanism that vibrates the laser beam that advances in the machining head 35 and is emitted from the opening 36a, in the opening 36a. How the galvano scanner unit 32 vibrates the laser beam will be described later.

The galvano scanner unit 32 has a scanning mirror 321 that reflects the laser beam emitted from the collimation lens 31, and a drive section 322 that rotates the scanning mirror 321 to a predetermined angle. Further, the galvano scanner unit 32 has a scanning mirror 323 that reflects the laser beam emitted from the scanning mirror 321, and a drive section 324 that rotates the scanning mirror 323 to a predetermined angle.

The drive sections 322 and 324 can reciprocally vibrate the scanning mirrors 321 and 323 within a predetermined angle range respectively based on control by the NC device 50. By reciprocally vibrating either one or both of the scanning mirror 321 and scanning mirror 323, the galvano scanner unit 32 vibrates the laser beam with which the sheet metal W is irradiated.

The galvano scanner unit 32 is one example of the beam vibrating mechanism, and the beam vibrating mechanism is not limited to the galvano scanner unit 32 having a pair of scanning mirrors.

Figure 3:
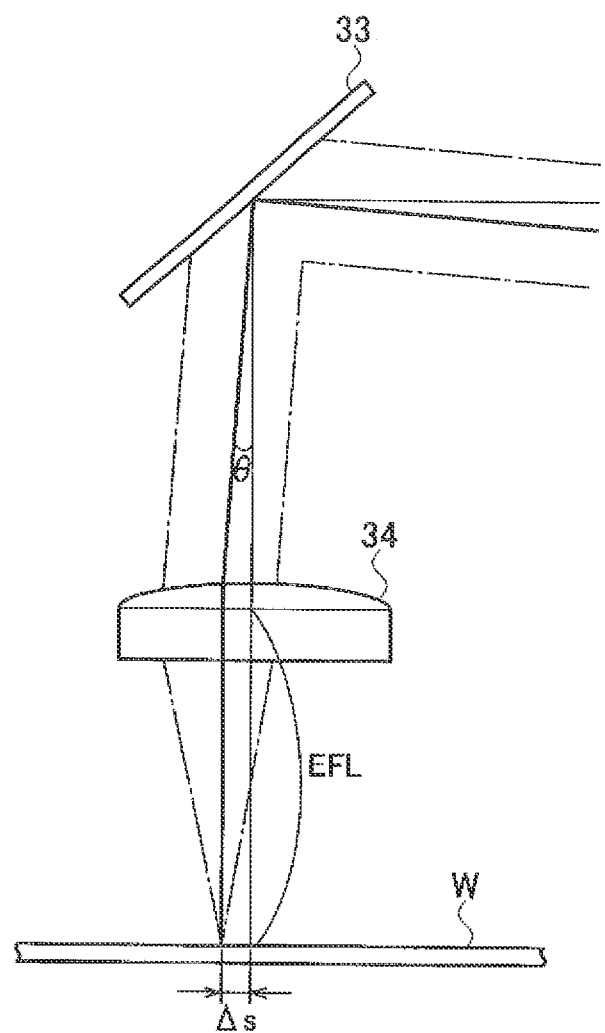
FIG. 3 is a diagram for explaining a displacement of an irradiation position of a laser beam to sheet metal by a beam vibrating mechanism.

FIG. 3 illustrates a state where either one or both of the scanning mirror 321 and the scanning mirror 323 is or are tilted, and a position of the laser beam with which the sheet metal W is irradiated is displaced. In FIG. 3, a fine solid line that is bent by the bend mirror 33 and passes through the focusing lens 34 shows an optical axis of the laser beam at the time of the regular state of the laser machining apparatus 100.

Note that, in detail, an angle of the optical axis of the laser beam that is incident on the bend mirror 33 changes by an operation of the galvano scanner unit 32 located in front of the bend mirror 33, and the optical axis deviates from a center of the bend mirror 33. In FIG. 3, for simplification, incident positions of the laser beams onto the bend mirror 33 are assumed to be same positions before and after the operation of the galvano scanner unit 32.

The optical axis of the laser beam is assumed to be displaced from the position shown by the fine solid line to a position shown by a thick solid line by the action by the galvano scanner unit 32. When the laser beam reflected by the bend mirror 33 is assumed to incline at an angle θ, an irradiation position of the laser beam on the sheet metal W is displaced by a distance Δs. When a focal length of the focusing lens 34 is EFL (Effective Focal Length), the distance Δs is calculated by EFL×sin θ.

If the galvano scanner unit 32 inclines the laser beam at the angle 9 in an opposite direction to a direction shown in FIG. 3, the irradiation position of the laser beam on the sheet metal W can be displaced by the distance Δs in an opposite direction to the direction shown in FIG. 3. The distance Δs is a distance less than a radius of the opening 36*a*, and is preferably a distance less than or equal to a maximum distance when the maximum distance is a distance obtained by subtracting a predetermined margin from the radius of the opening 36*a*.

The NC device 50 can vibrate the laser beam in a predetermined direction within a plane of the sheet metal W by controlling the drive sections 322 and 324 of the galvano scanner unit 32. By vibrating the laser beam, it is possible to vibrate a beam spot formed on a surface of the sheet metal W.

In the laser machining apparatus 100 configured as above, the NC device 50 reads a machining program from the machining program database 60, and selects any of a plurality of machining conditions stored in the machining condition database 70. The NC device 50 controls the laser machining apparatus 100 to machine the sheet metal W based on the read machining program and the selected machining condition. The laser machining apparatus 100 cuts the sheet metal W by the laser beam emitted from the laser oscillator 10 and produces a product having a predetermined shape.

Figure 4:
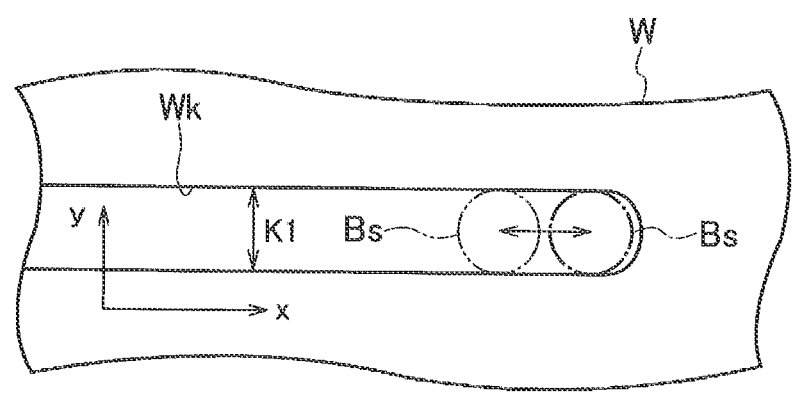
FIG. 4 is a diagram illustrating a parallel vibration pattern of the laser beam.

The galvano scanner unit 32 vibrates the laser beam as illustrated in FIG. 4. A cutting advancing direction of the sheet metal W is set as an x-direction, and a direction orthogonal to the x-direction within the plane of the sheet metal W is set as a y-direction. FIG. 4 shows a vibration pattern in a state where the machining head 35 is not moved in the x-direction to make it easier to understand the vibration pattern.

As illustrated in FIG. 4, the galvano scanner unit 32 vibrates a beam spot Bs in the x-direction within a groove Wk formed by advancement of the beam spot Bs, based on the control by the NC device 50. The vibration pattern is referred to as a parallel vibration pattern. In realty, the laser beam is vibrated in the parallel vibration pattern while the machining head 35 is moving in the cutting advancing direction. Non-Patent Literature 1 describes cutting a sheet metal while vibrating a laser beam in the parallel vibration pattern.

When a frequency at which the beam spot Bs is vibrated in the parallel direction with the cutting advancing direction is Fx, and a frequency at which the beam spot Bs is vibrated in a direction orthogonal to the cutting advancing direction is Fy, the parallel vibration pattern is a vibration pattern in which Fx:Fy is 1:0. The kerf width K1 of the groove Wk is same as a kerf width at a time when the beam spot Bs is not vibrated in the parallel vibration pattern.

Figure 5:
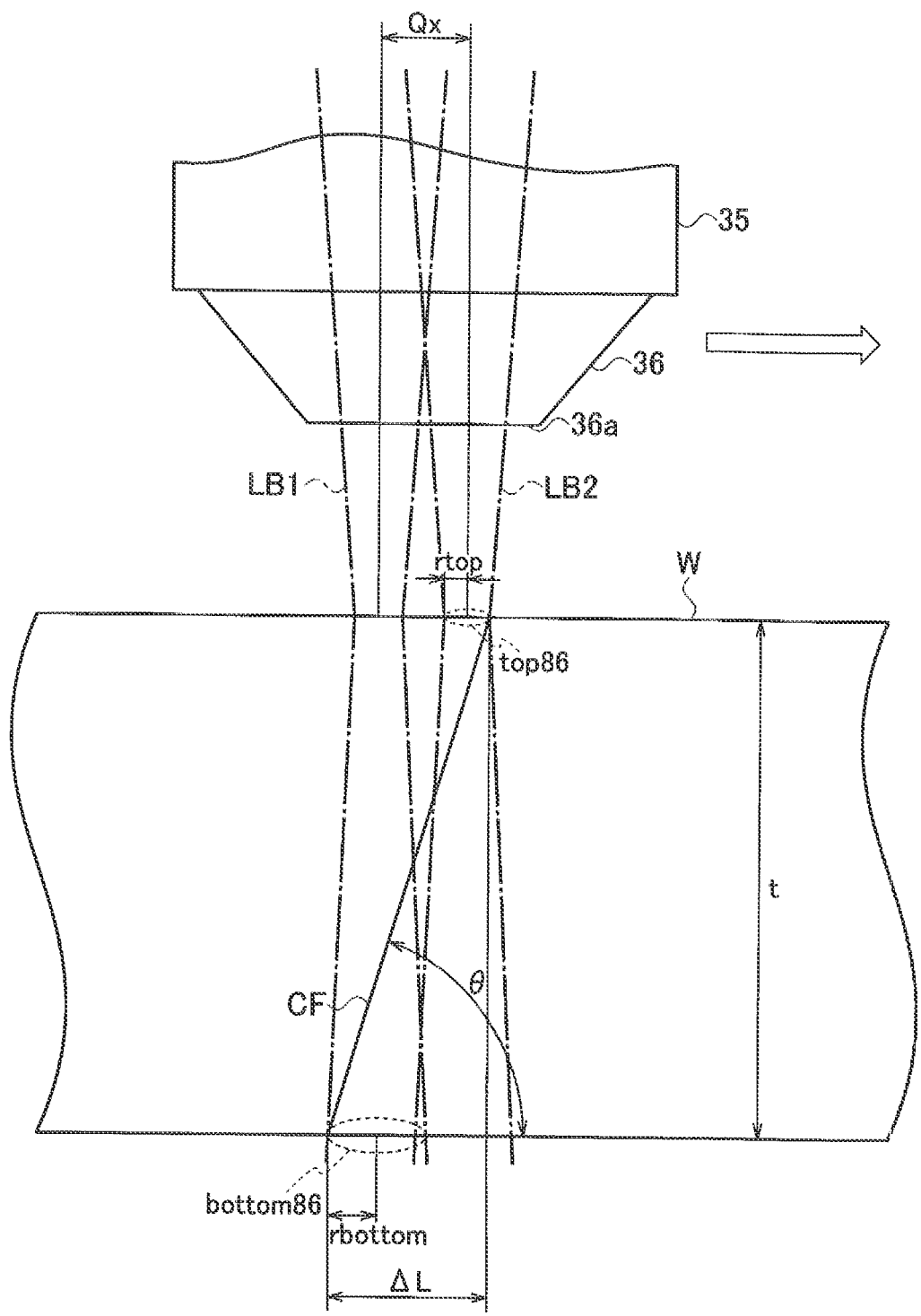
FIG. 5 is a diagram for explaining how to determine an appropriate range of an amplitude amount at a time of vibrating the laser beam in the parallel vibration pattern.

Next, a preferable amplitude amount is examined when the laser beam is vibrated in the parallel pattern by using FIG. 5. In FIG. 5, the laser machining apparatus 100 cuts the sheet metal W while moving the machining head 35 in the cutting advancing direction shown by a white arrow, and while vibrating the laser beam with which the sheet metal W is irradiated in the parallel vibration pattern.

Reference signs LB1 and LB2 respectively denote laser beams in positions that are displaced to a rearmost side and a frontmost side with respect to the cutting advancing direction. The laser beams vibrate with an amplitude amount Qx in the cutting advancing direction. The amplitude amount Qx is an interval between focus positions of the laser beams LB1 and LB2 on the sheet metal W. In one or more embodiments, it is not necessary to bring the laser beam into a defocused state as in the conventional case, and the laser beam may be brought into a just focus state where a focusing point is located on a top surface or in a vicinity of the top surface of the sheet metal W.

However, use of the defocused sate is not excluded. When the plate thickness of the sheet metal W is thicker than 8 mm, defocusing in a so-called in-focus state that focuses on an inside of the kerf may be used to discharge molten metal favorably.

When a conventional laser machining apparatus cuts the sheet metal W without vibrating the laser beam in a band of 1 µm in the parallel vibration pattern, machining defects are likely to occur because the molten metal in the kerf with a narrow width is cooled in a short time period and viscosity thereof increases to make the molten metal difficult to discharge.

In order to cut the sheet metal W, it is necessary to supply the sheet metal W with sufficient and intermittent energy necessary to satisfy the following two requirements. As a first requirement, the metal is melted within an irradiation time period of one time of a vibrating laser beam, and the molten metal is irradiated with the vibrating laser beam a plurality of times within a time period until the molten metal is discharged to keep a molten state (viscosity in particular). As a second requirement, a cut surface (inner surface of the kerf) is not excessively melted.

In one or more embodiments, by vibrating the laser beam in the parallel vibration pattern, the above described two requirements are satisfied, and the state where the viscosity of the molten metal is low is maintained for a longer time period than in a conventional art. Accordingly, even when the kerf width K1 is same as a conventional kerf width, the molten metal in the kerf is easily discharged, and therefore quality of the cut surface becomes good.

Of the sectional area in each of the positions in the advancing direction of the laser beam, a region that actually contributes to melting of the metal is a circular region having an area that occupies substantially 86% beam energy at a center side of total beam energy in the sectional area. On the top surface of the sheet metal W, a circular region top 86 having an area that occupies 86% beam energy at the center side of the sectional area (that is, an area of the beam spot Bs) of the laser beam on the top surface melts the sheet metal W. On a bottom surface of the sheet metal W, a circular region bottom 86 having an area that occupies 86% beam energy at the center side of the sectional area of the laser beam on the bottom surface melts the sheet metal W.

As illustrated in FIG. 5, a distance in a direction along the surface of the sheet metal W of a cutting front CF is set as ΔL. An angle θ of the cutting front CF is substantially 85°, and therefore the angle θ can be considered to be 85°. The distance ΔL is obtained by dividing a plate thickness t of the sheet metal W by tan θ.

Figure 6A:
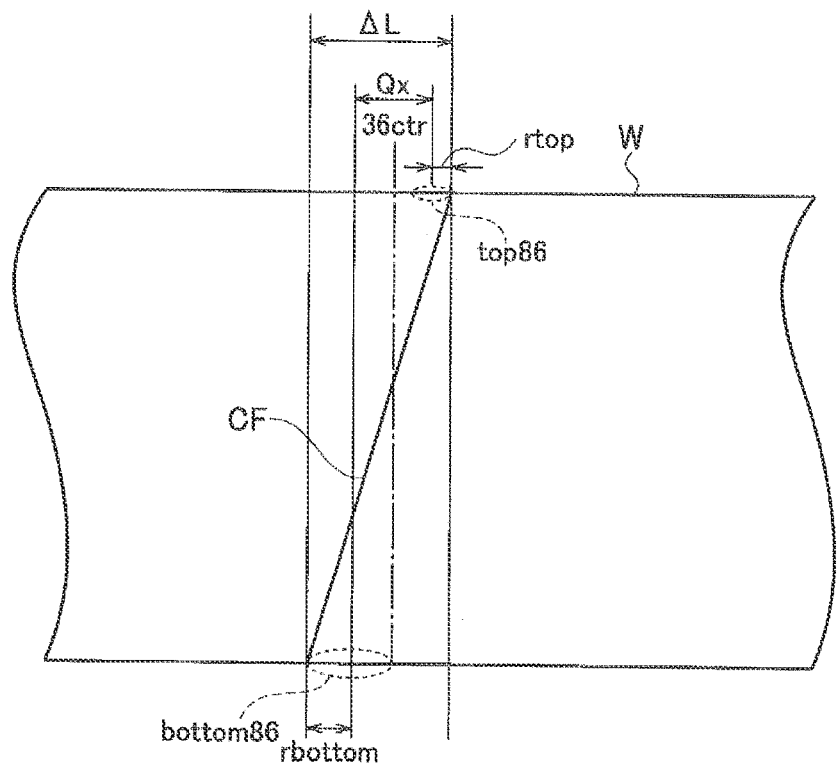
FIG. 6A is a diagram illustrating a state where the amplitude amount of the laser beam is minimum.

FIG. 6A shows a state where the amplitude amount Qx is minimum. FIG. 5 corresponds to the state in FIG. 6A. At this time, the distance ΔL can be expressed by expression (1) by using the amplitude amount Qx, a radius rbottom of the circular region bottom 86, and a radius rtop of the circular region top 86. Reference sign 36ctr in FIG. 6A and FIG. 6B denotes a center of the nozzle 36.

$$\Delta L = Qx + r\text{bottom} + r\text{top} \quad (1)$$

Figure 6B:
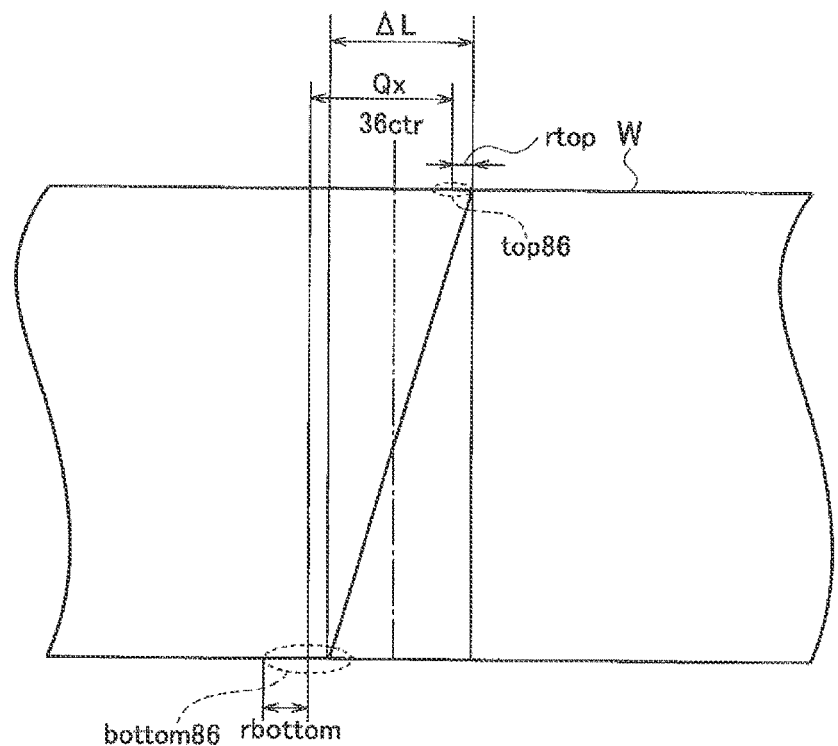
FIG. 6B is a diagram illustrating a state where the amplitude amount of the laser beam is maximum.

FIG. 6B illustrates a state where the amplitude amount Qx is maximum. A distance from a center of the circular region bottom 86 to a lower end portion of the cutting front CF is equal to the radius rtop. Accordingly, the distance ΔL in FIG. 6B is equal to the amplitude amount Qx.

Accordingly, a preferable range which the amplitude amount Qx takes can be expressed by expression (2).

$$\Delta L - r\text{bottom} - r\text{top} \leq Qx \leq \Delta L \quad (2)$$

When the NC device 50 vibrates the laser beam so as to satisfy expression (2) by the galvano scanner unit 32, it is possible to irradiate the entire cutting front CF with the laser beam, and it is possible to cut the sheet metal W favorably. The thicker the plate thickness t, the longer the distance ΔL, and therefore, it is necessary to make the amplitude amount Qx larger as the plate thickness t becomes thicker.

The angle θ of the cutting front CF may be a Brewster's angle that is an angle at which an energy absorption rate of metal is highest, or may not be the Brewster's angle. As the requirements for metal to melt within an irradiation time period of the vibrating laser beam of one time, the Brewster's angle is not essential. It is suitable if a relationship between the energy density and the time period required for metal to melt is established within the irradiation time period of one time. Further, from a relationship between the viscosity of the molten metal and the angle θ of the cutting front CF, the molten metal can just flow down.

As above, in the laser machining apparatus and the laser machining method of one or more embodiments, in order to cut a sheet metal made of stainless steel of a plate thickness of 3 mm or more, it is preferable to set an appropriate amplitude amount at the time of vibrating the laser beam in the parallel vibration pattern.

Next, how to reduce a consumption amount of assist gas in one or more laser machining apparatuses and laser machining methods will be described. As described above, as the nozzle diameter becomes larger, the consumption amount of the assist gas becomes larger, and therefore, in order to reduce the consumption amount of the assist gas, the nozzle diameter can be reduced.

How to determine a minimum nozzle diameter with which cutting of the sheet metal W is possible will be described by using examples of cutting the sheet metals W shown by numbers 1 to 4 illustrated in FIG. 7. As illustrated in FIG. 7, the amplitude amount Qx at a time of cutting the sheet metal W with a plate thickness of 4 mm of number 1 is 0.140 mm, the radius rtop is 0.057 mm, and the radius rbottom is 0.116 mm. The amplitude amount Qx at a time of cutting the sheet metal W of a plate thickness of 6 mm of number 2 is 0.224 mm, the radius rtop is 0.057 mm, and the radius rbottom is 0.185 mm.

The amplitude amount Qx at a time of cutting the sheet metal W of a plate thickness of 8 mm of number 3 is 0.301 mm, the radius rtop is 0.057 mm, and the radius rbottom is 0.255 mm. The amplitude amount Qx at a time of cutting the sheet metal W of a plate thickness of 10 mm of number 4 is 0.500 mm, the radius rtop is 0.057 mm, and the radius rbottom is 0.325 mm.

A calculation value Va is defined by expression (3). The reason for multiplying the radius rbottom by the square root of 2 in expression (3) is as follows. A range in which the gas flow of the assist gas flowing from the top surface side to the bottom surface side of the sheet metal W on the cutting front CF has an influence at the lower surface side has a longer distance than the radius rbottom, and it is possible to obtain a distance of the range in which the gas flow actually has an influence by multiplying the radius rbottom by the square root of 2.

[Expression 3]

$$Va = (Qx + r\text{top} + \sqrt{2} \times r\text{bottom}) \quad (3)$$

When a standard deviation of the calculation value Va is Vasd, the standard deviation Vasd is 0.279. A minimum value Dmin of a nozzle diameter in calculation is expressed by 2Va−Vasd, and a maximum value Dmax of the nozzle diameter in calculation is expressed by 2.5 Va+Vasd. The minimum values Dmin and the maximum values Dmax at the time of cutting the sheet metals W of numbers 1 to 4 are respectively 0.44 and 1.18, 0.81 and 1.64, 1.16 and 2.08, and 1.76 and 2.82.

The reason why magnifications to the calculation value Va are 2 and 2.5 is as follows. The inventor noted that the calculation value Va roughly corresponds to a radius of the nozzle 36. Accordingly, in order to obtain the diameter (nozzle diameter) of the nozzle 36, a minimum value of the magnification is 2.

One of actions of the assist gas flowing on the cutting front CF is heat dissipation (heat transfer). Heat transfer is said to be proportional to the square of the cube root of the flow velocity. When a square of a top surface of a cube is considered as a square inscribed in the opening 36a of the nozzle 36, one side of the square is the square root of 2 when the radius of the nozzle 36 is 1. Considering these, a maximum value of the magnification can be obtained by expression (4) as follows.

$$[\{(2Va)^{1/2}\}^{1/3}]^2 \times 2Va \quad (4)$$

When the calculation value Va is 1, the maximum value of the magnification is approximately 2.5 based on expression (4).

Nozzle diameters that actually exist are 1.0 mm, 1.5 mm, 2.0 mm, 4.0 mm, 7.0 mm, and 10.0 mm, and therefore, nozzle diameters in calculation that can be used at the time of cutting the sheet metals W of numbers 1 to 4 are respectively 1.0 mm, 1.0 mm and 1.5 mm, 1.5 mm and 2.0 mm, and 2.0 mm. Accordingly, minimum nozzle diameters that can be used at the time of cutting the sheet metals W of numbers 1 to 4 are respectively 1.0 mm, 1.0 mm, 1.5 mm, and 2.0 mm.

As illustrated in FIG. 7, a standard nozzle diameter used for cutting the sheet metal W of numbers 1 to 3 is 4.0 mm, and a standard nozzle diameter used for cutting the sheet metal W of number 4 is 7.0 mm. According to the laser machining apparatus and the laser machining method of one or more embodiments, it is possible to cut the sheet metal W by using the nozzle 36 with a smaller nozzle diameter than the standard nozzle diameter. Note that, for example, gas pressures of the assist gas at the time of cutting the sheet metals W of numbers 1 to 4 are respectively 1.2 MPa, 1.4 MPa, 1.6 MPa, and 1.3 MPa.

According to the laser machining apparatus and the laser machining method of one or more embodiments, it is possible to cut the sheet metal W with good quality of the cut surface at a high speed by vibrating the laser beam in the parallel vibration pattern. Further, according to the laser machining apparatus and the laser machining method of one or more embodiments, it is possible to cut the sheet metal W without impairing the effects that the quality of the cut surface is good, and high-speed cutting is possible, by using the nozzle 36 with the usable nozzle diameter in the range of the minimum value Dmin to the maximum value Dmax selected by a theory such as the above.

According to the laser machining apparatus and the laser machining method of one or more embodiments, it is possible to decrease the consumption amount of the assist gas more significantly than the conventional laser machining apparatus and laser machining method, and therefore, it is possible to reduce cost of cutting the sheet metal W to produce products.

The present invention is not limited to the one or more embodiments described above, and can be variously changed within the range without departing from the summary of the present invention.

The disclosure of this application relates to the subject described in Japanese Patent Application No. 2018-128774 filed on Jul. 6, 2018, the entire disclosed contents of which are incorporated herein by reference.

The invention claimed is:

1. A laser machining apparatus, comprising:
    a machining head with a nozzle being attached to a tip end of the machining head, the nozzle having an opening formed therein, a laser beam for cutting a sheet metal being emitted through the opening;
    a moving mechanism configured to relatively move the machining head with respect to a surface of the sheet metal; and
    a beam vibrating mechanism configured to vibrate the laser beam in a parallel direction with a cutting advancing direction of the sheet metal when the sheet metal is cut by the machining head being relatively moved by the moving mechanism,
    wherein a calculation value Va is expressed by the following expression, $$Va = (Qx + r\text{top} + \sqrt{2} \times r\text{bottom})$$

where an amplitude amount of the laser beam by the beam vibrating mechanism is Qx, a radius of a first circular region having an area occupying 86% beam energy at a center side of total beam energy in a sectional area of the laser beam on a top surface of the sheet metal is rtop, and a radius of a second circular region having an area occupying 86% beam energy at a center side of total beam energy in a sectional area of the laser beam in a bottom surface of the sheet metal is rbottom, and
    when a standard deviation of the calculation value Va at a time of cutting sheet metals of a plurality of plate thicknesses is Vasd,
    a nozzle having a diameter of an opening between a minimum value obtained by 2Va−Vasd, and a maximum value obtained by 2.5 Va+Vasd is used as the nozzle.

2. The laser machining apparatus according to claim 1, wherein out of nozzles having diameters of openings between the minimum value and the maximum value, a nozzle having a minimum diameter is used as the nozzle.

3. The laser machining apparatus according to claim 1, wherein when a distance in a direction along a surface of the sheet metal of a cutting front is ΔL, the beam vibrating mechanism vibrates the laser beam to satisfy $$\Delta L - r\text{bottom} - r\text{top} \leq Qx \leq \Delta L.$$

4. A laser machining method, comprising:
    emitting a laser beam for cutting a sheet metal from a nozzle to irradiate the sheet metal with the laser beam, the nozzle being attached to a tip end of a machining head and having an opening formed therein;
    cutting the sheet metal by relatively moving the machining head with respect to a surface of the sheet metal; and
    vibrating the laser beam in a parallel direction with a cutting advancing direction of the sheet metal when the sheet metal is cut,
    wherein a calculation value Va is expressed by the following expression, $$Va = (Qx + r\text{top} + \sqrt{2} \times r\text{bottom})$$

where an amplitude amount at a time of vibrating the laser beam is Qx, a radius of a first circular region having an area occupying 86% beam energy at a center side of total beam energy in a sectional area of the laser beam on a top surface of the sheet metal is rtop, and a radius of a second circular region having an area occupying 86% beam energy at a center side of total beam energy in a sectional area of the laser beam in a bottom surface of the sheet metal is rbottom, and
    when a standard deviation of the calculation value Va at a time of cutting sheet metals of a plurality of plate thicknesses is Vasd,
    a nozzle having a diameter of an opening between a minimum value obtained by 2Va−Vasd, and a maximum value obtained by 2.5 Va+Vasd is used as the nozzle.

5. The laser machining method according to claim 4, wherein out of nozzles having diameters of openings between the minimum value and the maximum value, a nozzle having a minimum diameter is used as the nozzle.

6. The laser machining method according to claim 4, wherein when a distance in a direction along a surface of the sheet metal of a cutting front is ΔL, the laser beam is vibrated to satisfy $$\Delta L - r\text{bottom} - r\text{top} \leq Qx \leq \Delta L.$$

* * * * *